United States Patent [19]

Monreal Urzay

[11] Patent Number: 4,543,788
[45] Date of Patent: Oct. 1, 1985

[54] PROCESS FOR CONVERTING THE INTERNAL ENERGY OF LIQUID $CO_2$ INTO MECHANICAL ENERGY CAPABLE OF PRODUCING WORK AS IT CHANGES FROM LIQUID TO GAS OVER ITS CRITICAL TEMPERATURE

[76] Inventor: Dario Monreal Urzay, Sangüesa, 12, Pamplona, Spain

[21] Appl. No.: 358,796

[22] Filed: Mar. 16, 1982

[30] Foreign Application Priority Data

Mar. 27, 1981 [ES] Spain ................................. 500.786
Nov. 27, 1981 [ES] Spain ................................. 507.540

[51] Int. Cl.[4] .............................................. F03G 7/06
[52] U.S. Cl. ...................................... 60/531; 60/647; 60/509
[58] Field of Search ................ 60/527, 530, 531, 647, 60/508, 509, 512, 513

[56] References Cited

U.S. PATENT DOCUMENTS

| 668,682 | 2/1901 | Henderson | 60/647 |
|---|---|---|---|
| 2,548,708 | 4/1951 | Dickey | 60/531 |
| 3,905,195 | 9/1975 | Gregory | 60/512 |
| 4,149,383 | 4/1979 | Spalding | 60/509 |

FOREIGN PATENT DOCUMENTS

| 941126 | 3/1956 | Fed. Rep. of Germany | 60/531 |
|---|---|---|---|
| 3001307 | 9/1981 | Fed. Rep. of Germany | 60/531 |
| 2440479 | 7/1980 | France | 60/531 |
| 258224 | 4/1927 | United Kingdom | 60/647 |

Primary Examiner—Allen M. Ostrager
Attorney, Agent, or Firm—Wenderoth, Lind & Ponack

[57] ABSTRACT

Process and machine are disclosed for converting the internal energy of a fluid into mechanical energy capable of producing work, based on the use of the fluid having two alternative states, liquid and gaseous, at temperatures below and above, respectively, its critical temperature. In a first step the fluid is liquefied at a temperature and a pressure below the critical temperature and pressure thereof and is introduced into a chamber provided with means for transmitting movement and means for transmitting heat. In a second step the liquefied fluid is subjected to a rapid heating, whereby the critical temperature is exceeded, the pressure is considerably increased, and the fluid is converted to the gaseous state. In a third step the fluid is expanded in the interior of the chamber in spite of the resistance offered by the means for transmitting movement. In a fourth step there are provided means whereby the fluid recovers and returns to the initial conditions of the first step.

2 Claims, 3 Drawing Figures

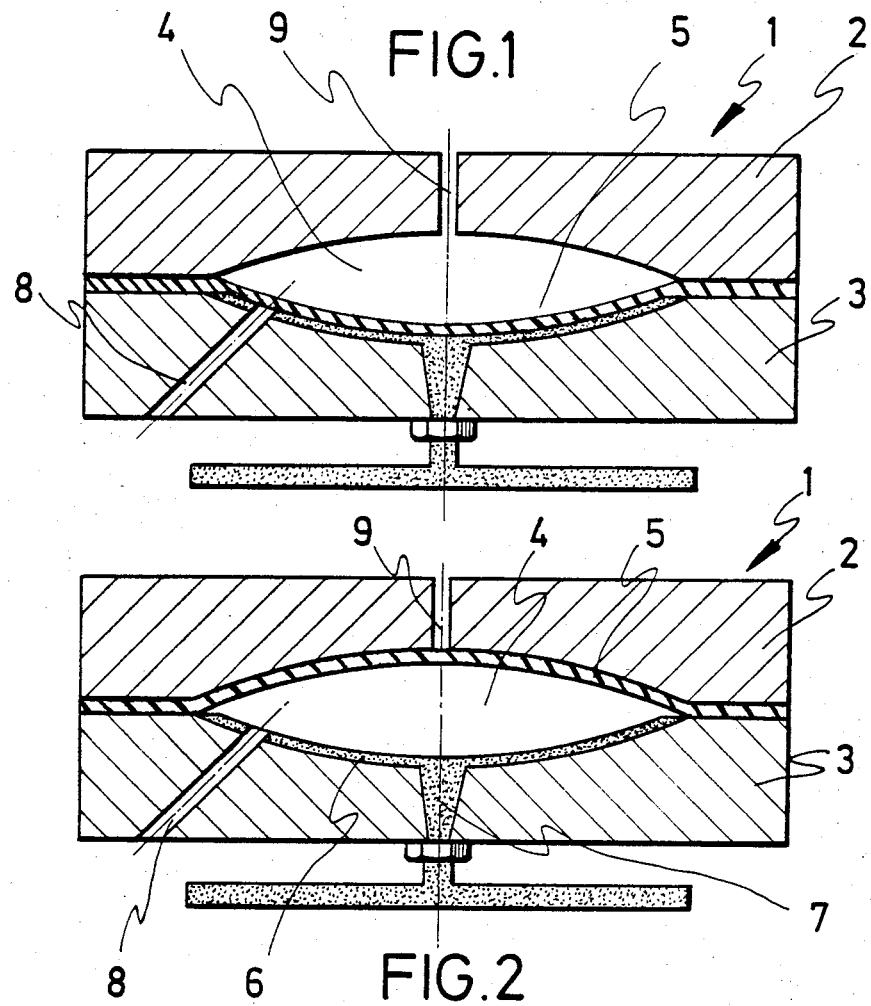

PROCESS FOR CONVERTING THE INTERNAL ENERGY OF LIQUID CO2 INTO MECHANICAL ENERGY CAPABLE OF PRODUCING WORK AS IT CHANGES FROM LIQUID TO GAS OVER ITS CRITICAL TEMPERATURE

BACKGROUND OF THE INVENTION

1. Field of the Invention

The present invention relates to a process and a machine for converting the internal energy of a fluid into mechanical energy capable of producing work. The term "internal energy" is used in its traditional thermodynamic sense as the sum of the kinetic and potential energies.

2. Description of the Prior Art

The process of the present invention departs from the known principle that a gas cannot be liquefied at a temperature above its critical temperature, even though the gas is compressed. Accordingly, if the critical temperature of a liquefied gas is exceeded due to a rapid heating, such gas will immediately acquire the gaseous state, with the consequent increase in volume and pressure as established in the general equation of gases.

There are known what is called the "Andrews isotherms" or experiments made with carbonic anhydride enclosed in a tube and subjected to different temperatures, recording at all times the pressure and the volume inherent to the gas. From such experiments the critical point for carbonic anhydride was established at a temperature of 31.1° C., above which critical point or temperature it is impossible to obtain, by mere isothermic compression, the liquefaction of the fluid.

SUMMARY OF THE INVENTION

Thus, the invention. partly based on these experiments of Andrews, discloses a process, as well as the necessary devices, for closing a working cycle, wherefore there can be obtained an available energy derived from the processes for the expansion and liquefaction of a fluid. Concretely, the fluid preferably used in the invention is carbonic anhydride, due to the intrinsic characteristics thereof.

Basically, the invention comprises introducing a mass of carbonic anhydride in a cylinder or a similar device which is initially maintained at a low temperature, for example 20° C., and at a pressure such that the totality of the carbonic anhydride subjected to these conditions is in a liquid state.

The mass of carbonic anhydride, in a liquid state, is then subjected to a rapid heating, wherefore the temperature is elevated above the critical temperature of the carbonic anhydride (31.1° C.), thus and so that the general equation of the gases is complied with, the result of the pressure due to the volume which at this moment is adopted by the fluid should be increased considerably. If, in the first instant the volume in which the carbonic anhydride is enclosed is not allowed to be increased, the pressure of this fluid should be increased, but if the volume is allowed to be changed, for instance by means of the displacement of the plunger which compresses the carbonic anhydride, the expansion of the gas could be used as a means for obtaining energy.

Once said movement has been obtained, the carbonic anhydride, now in a completely gaseous state, could be recycled to its original liquid state by means of the opportune processing which changes the present conditions thereof, cooling it to its initial temperature and returning thereto the original pressure and volume. This return to the initial conditions of the system, thus formed, logically takes place at the cost of a determined work proportioned by outer agents, which can be proportioned by other similar assemblies operating in steps.

Thus, the process of the present invention basically comprises the following steps:

1. Introducing in a suitable device or machine a fluid, preferably carbonic anhydride, having such initial pressure, volume and temperature conditions that the fluid adopts the complete liquid phase;
2. Elevating the temperature of the fluid above the critical temperature inherent thereto, 31.1° C. for the mentioned carbonic anhydride.
3. Allowing the fluid, now in a gaseous state, to expand rapidly utilizing the energy derived from such expansion, by suitable mechanism.
4. Returning the fluid and the mechanisms to the initial conditions of point 1, utilizing, for example, the energy derived from a similar adjacent process.

For a better understanding of the different situations through which the carbonic anhydride passes during the mentioned process, some experiments carried out in accordance with the present invention are cited by way of example:

A mass of 100 g of liquid carbonic anhydride at a pressure of 75 atmospheres and a temperature of 20° C. was introduced in a steel cylinder having a diameter of 8 cm and compressed by a plunger. The liquid occupied a volume of approximately 100 cc. under such conditions. If this liquid is heated to 100° C., a pressure of about 683 atmospheres will be produced in the first instant, which pressure will displace the plunger, forcing it to move a distance of 18 cm., at which point the volume is nine times greater then the initial volume and at which the pressure is equal to the initial pressure of 75 atmospheres.

Thus, this change in the volume of the gas has been utilized in the operation of displacing the plunger.

If, instead of heating the liquid carbonic anhydride to 100° C., it is heated to 35° C. (which temperature is 4° higher than the critical temperature of carbonic anhydride), there will be produced in the first instant a pressure of 564 atmospheres which will displace the plunger, forcing it to move a distance of 14.9 cm., at which point the volume is 7.5 times greater than the initial volume and at which the pressure is equal to the initial pressure of 75 atmospheres.

The return of the carbonic anhydride to the initial conditions could be carried out by the action of a second cylinder, which will extract the $CO_2$ vaporized in the first cylinder, cooling it to 20° C. and liquefying it for a successive cycle.

It should be pointed out that in this second experiment the temperatures with which the process operates are relatively low temperatures and can readily be reached by natural means, a fact which is highly interesting from the point of view of energy yield.

Although the specification describes the device for utilizing the internal energy of the carbonic anhydride as being a cylinder provided with a plunger, it has been verified that an ideal device which proportions a better yield is that comprising a modular structure which is unitary composed of a body, in the interior of which there is defined a chamber divided into two parts by an elastic diaphragm on which the expansions of the gas will act, which diaphragm will be capable of acting on a hydraulic or a pneumatic circuit or the like to utilize and multiply the displacements of the diaphragm in question.

BRIEF DESCRIPTION OF THE DRAWINGS

A more complete description of this machine as well as the process of the invention will now be made with the help of a set of drawings, the figures of which, illustratively and not limiting, represent the following:

FIG. 1 corresponds to a schematic sectional view of one module of the machine, the diaphragm of which adopts an initial inoperative position.

FIG. 2 represents a view similar to the preceding, wherein the elastic diaphragm has been displaced as a result of the push exerted thereon by the vaporized gas introduced in the interior of the chamber.

DETAILED DESCRIPTION OF THE PREFERRED EMBODIMENTS

Figure 3:
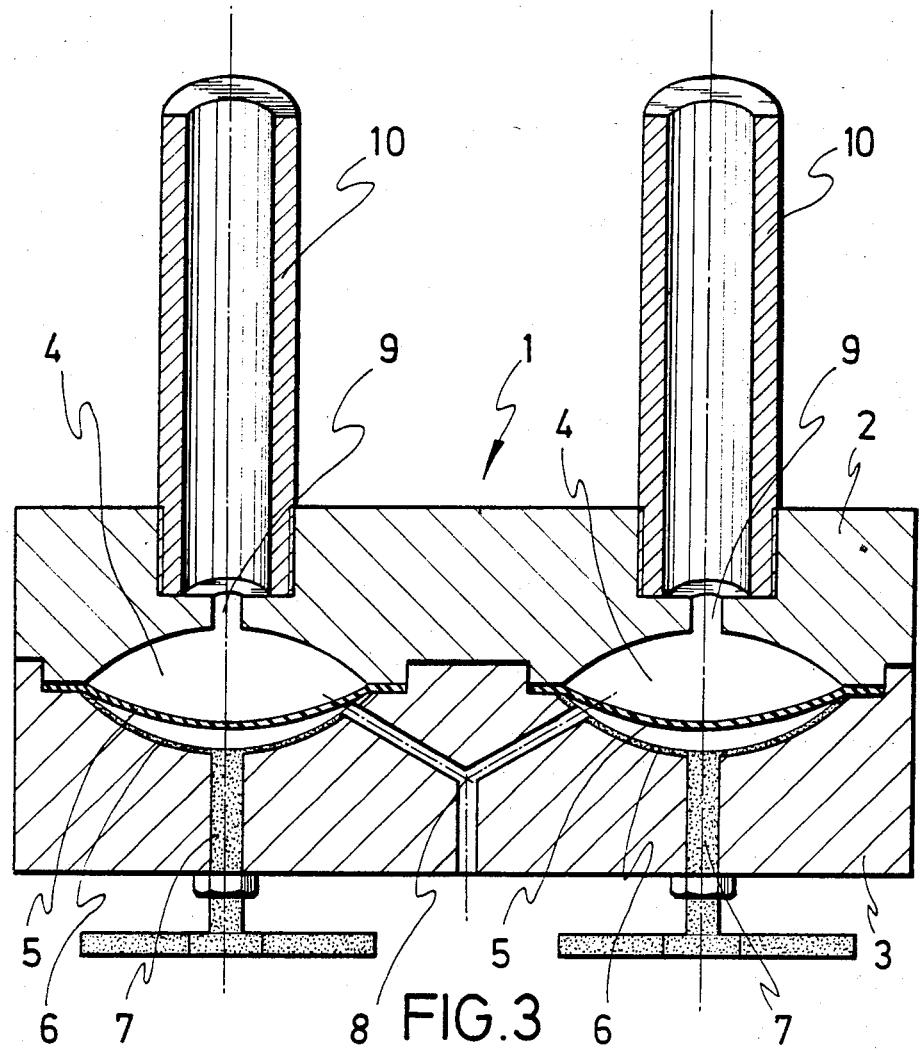
FIG. 3 represents a schematic sectional view of a machine composed of two interassociated modules, provided with their corresponding chambers and elastic diaphragms and which will function interactively.

Referring to the mentioned figures, the process and the machine for converting the internal energy of a fluid into mechanical energy capable of producing work, made in accordance with the invention, basically consists in liquefying a fluid, preferably carbonic anhydride, at a temperature below its critical temperature to then suddenly raise its temperature, producing the conversion to the gaseous state with the consequent increase in the pressure and temperature variables thereof, the gaseous fluid being passed to an energy developing chamber in which the increase in the volume of the fluid is converted into the work derived from the displacement of a mechanical element. Once the displacement of the fluid has taken place, by external means, which can be those derived from a similar adjacent process, it recovers its original liquid state and low temperature conditions, the fluid itself being in a position to effect a new energy developing cycle.

The complete process can be carried out in a cylinder having conventional plungers, although a higher yield is obtained with a modular device or machine as that which will now be described.

As seen in FIG. 1, the modular device comprises a block 1 formed in two parts 2 and 3 which, coupled to each other, define interiorly a chamber 4. There is coupled between these two parts 2 and 3 an elastic diaphragm 5 which divides the chamber 4, said elastic diaphragm 5 being capable of producing displacements since the edges thereof are firmly gripped between the parts 2 and 3 of the block 1.

As shown in FIG. 2, a lower surface of the chamber 4 is coated with a layer 6 of material having a high capacity of calorific conductivity, which layer 6 projects outwards through part 3 of the block 1 in a packing into a sector 7 which defines a calorific receiving base connected to a heat source at the bottom thereof.

Below the diaphragm 5 there is located a gas inlet and outlet duct 8, between the corresponding installation and the lower part of the chamber 4.

Part 2 of the block 1 is provided with an outlet 9 connected to the chamber 4, to which there is coupled a means for developing energy, such as a hydraulic piston or the like.

With this arrangement, when the fluid in a liquid state is made to enter the outlet duct 8, it will remain between the layer 6 having a high calorific conductivity and the elastic diaphragm 5. In this position heating of the sector 7 and, consequently, of the layer 6 itself takes place, whereby the fluid will exceed the critical temperature, obtaining a rapid vaporization and the consequent expansion thereof, which would produce a rapid displacement of the diaphragm 5 to the butt consituted by the upper zone of the chamber 4. Since the upper surface of the diaphragm 5 is constantly in contact with an elastic fluid, this will be displaced through the outlet 9 to produce the movement of any mechanical element coupled to this arrangement.

Concretely, as illustrated in FIG. 3, the hydraulic fluid which is displaced through the outlet duct 9, will cause the movement of a piston along its corresponding cylinder 10, wherefore this rectilinear movement of the piston could be converted into a circular movement by means of a crankshaft or an eccentric.

For the fluid to return to its initial conditions, the gas contained in the lower part of the chamber 4 will be discharged by, for example, the reverse action of another similar device, condensing said gas and placing it to effect a new working cycle.

The vaporization of the liquefied gas could take place in high capacity tanks filled with hydraulic fluid, in which the pressure of the gas will be transmitted to the fluid through an elastic diaphragm 5 which separates them and which prevents the leakages of gas, which diaphragm 5 is capable of being adapted between the wall parts 2 and 3 of a tank or block. The gas could press against one face of the diaphragm 5 which separates it from the fluid, this exerting, by the vaporization of the gas, a pressure on the hydraulic fluid which, in the form of a stream, will move a turbine or a hydraulic motor, this complete process being carried out in a closed circuit so that the gassified fluid is recovered to be used again in a new cycle due to a similar and combined action which takes place in another tank, with the help of which the first tank is again filled with hydraulic fluid, discharging the gas and liquefying it to be used again. A series of tanks could also be used to obtain the pressurized fluid flow which will move the turbine or the hydraulic motor.

As repeatedly mentioned, the liquefied gas, preferably used in the invention, is carbonic anhydride which has a critical temperature of 31.1° C. and a critical pressure of 73 atmospheres, which parameters permit it to operate under highly profitable conditions from the point of view of energy.

Distinct modules having this structure could be interactively associated, so that each one of them proportions to its adjacent module the energy or work necessary to close the working cycle, i.e. the work produced in one of the modules could be used as the element for the absorption and subsequent liquefaction of the gas expanded in the associated module, giving rise to a thermal machine having a high efficiency and yield.

I claim:

1. Process for converting the internal energy of a fluid into mechanical energy capable of producing work, based on the use of the fluid having two alternative states, liquid and gaseous, at temperatures below and above its critical temperature, said critical temperature being higher than but close to normal ambient temperature, essentially characterized in that it comprises several operative steps:

liquefying the fluid at a temperature and a pressure below the critical temperature and critical pressure thereof;

introducing the liquefied fluid into a chamber provided with means for transmitting movement and means for transmitting heat;

pressurizing the fluid to a pressure at or above the critical pressure prior to heating;

subjecting the liquefied fluid to a rapid heating, whereby the critical temperature is exceeded, the pressure is considerably increased, and the fluid is immediately converted to the gaseous state;

expanding the gasified fluid rapidly in the interior of the chamber against resistence offered by the means for transmitting movement to produce work; and recovering and returning the fluid to the initial conditions below the critical temperature and critical pressure.

2. Process for converting the internal energy of a fluid into mechanical energy capable of producing work according to claim 1, characterised in that the fluid used is carbonic anhydride.

* * * * *